United States Patent [19]

Hirsch

[11] Patent Number: 5,276,738

[45] Date of Patent: Jan. 4, 1994

[54] SOFTWARE DATA PROTECTION MECHANISM

[75] Inventor: Thomas S. Hirsch, Bedford, Mass.

[73] Assignee: Bull HN Information Systems Inc., Billerica, Mass.

[21] Appl. No.: 992,210

[22] Filed: Dec. 17, 1992

[51] Int. Cl.⁵ .......................... H04L 9/02; H04L 9/00
[52] U.S. Cl. .......................... 380/46; 380/4; 380/21
[58] Field of Search .......................... 380/4, 21, 46

[56] References Cited

U.S. PATENT DOCUMENTS

4,176,247 11/1979 Englund .
4,476,566 10/1984 Dent .......................... 375/46
4,742,543 5/1988 Fredericksen .......................... 380/46

Primary Examiner—Stephen C. Buczinski
Attorney, Agent, or Firm—Faith F. Driscoll; John S. Solakian

[57] ABSTRACT

A protection mechanism includes means for taking an input binary value and generating a unique key value as well as performing the reverse operation of taking a key value and generating an input binary value. The mechanism includes a scrambler which includes an array having a number of multibit container locations for storing a unique sequence of random numbers. The scrambler forms another binary value by rearranging the bits of the input binary value as a function of the random number values in addition to altering the states of such bits as a function of the random number values and the numeric bit position values of sources of the input binary bits. The resulting binary value is applied to an alphanumeric encoder which converts the binary value into a series of alphanumeric characters containing a valid key value.

13 Claims, 7 Drawing Sheets

SOFTWARE DATA PROTECTION MECHANISM

BACKGROUND OF THE INVENTION

1. Field of Use

The present invention pertains to data protection systems and, more particularly, to systems useful in performing software licensing verification.

2. Prior Art

Software is viewed as an important valuable asset whose use must be protected to the extent possible from unauthorized copying and distribution. Many companies protect software through the use of license agreements. In certain instances, locking mechanisms have been incorporated into software packages distributed to end users which prevent the making of copies of such software after the software is installed into a system. However, this type of approach has been found inconvenient to users since it does not allow users to make necessary copies (e.g. archival copies) to prevent interruptions in normal business operations. Others have employed encryption and decryption techniques to protect unauthorized copying. The overhead in performing such operations is substantial which reduces processing system efficiency.

Still others have utilized programmed algorithms to protect against unauthorized access. Such algorithms can be ascertained from an examination of the program's source code. Also, decompiler products are available on the market which can be used to extract the algorithms from the object code version of the program. Thus, it has become difficult to ensure the security of such algorithms in such cases. Further, the above approaches have been found to be costly to implement, complex or complicated to use or inconvenient to end users.

Accordingly, it is a primary object of the present invention to provide a mechanism for generating key values that cannot be easily counterfeited which control the use of software packages.

It is a further object to provide a mechanism whose documentation and source code can be distributed to end users without requiring extensive security measures.

SUMMARY OF THE INVENTION

The above objects and advantages of the present invention are achieved in the preferred embodiment of the protection mechanism of the present invention. The mechanism includes means for taking an input binary value which is 32 bits in the preferred embodiment and generating a unique key value as well as performing the reverse operation of taking a key value and generating an input binary value. The mechanism includes a scrambler which includes storage for an input binary number and an associated memory array having a number of multibit container locations. Each of the container multibit locations stores a different one of a unique sequence of random number values. The number of random number values corresponds to the number of bits of the input binary value.

The scrambler takes the stored input binary value, rearranges the bits as a function of the random number values in addition to altering the states of such bits by complementing or inverting them as a function of the contents of the random number values stored in the container multibit locations and the numeric bit position values of the sources of the input binary bits applied to the container bit locations. The container bit locations are used to rearrange the bits of the input binary number by redirecting such bits to different bit positions of an output register as a function of the different random number values. Thus, the organization of the scrambler can be likened to a type of crossbar switching matrix array.

In the preferred embodiment, the redirection value for each bit is generated by exclusively oring, the numeric value of corresponding bit position of the input binary number and corresponding random number value. The state of the least significant bit of each result of such exclusive oring determines if the input binary bit is complemented before being applied to each of the different bit positions of an output register. That is, the exclusive or operation determines whether or not the complement of the input binary bit is applied to the bit position of the output register.

According to the present invention, the scrambler utilizes a conventional pseudo random number generator which is driven by so-called seed and start input values. In the preferred embodiment, the seed value corresponds to an input value applied to the pseudo random number generator for generating the required sequences of unique random number values. The pseudo random number generator generates the same sequence of random number values for a particular seed value. The start value is a unique value associated with a particular user system, such as the serial number of the system on which the software is to be installed. The container multibit positions are filled with unique random number values based on the seed and start input values.

The binary value stored in the scrambler output register is converted into a user key value by an alphanumeric encoder. In the preferred embodiment, the encoder takes overlapping groups of bits or fields from the stored binary value and produces a predetermined number of alphanumeric characters. The encoding is carried out through the use of a table which stores a predetermined number of alphanumeric characters.

The scrambler and encoder operate in the reverse fashion in converting a key value into a 32 bit input binary value.

The design documentation of the present invention in addition to any source code related to its implementation are not required to be hidden. The reason is that without knowing all of the values used to generate the key value, it is not possible to predict what changes have to be made in the key in order to produce another valid 32 bit input binary value. Further, the encoder also allows changes in the characters used to represent the scrambler output.

In the preferred embodiment, a serial number is used as part of the input binary value because it can be uniquely assigned and can be easily verified by the system running the application. Even though the serial number is utilized as part of the input binary value, knowing the value of the key and its pattern of change for another system will not be useful in determining what to change to obtain a valid key. The reason is that the serial number value is used in generating the random number values. Thus, the present invention provides the required security notwithstanding publication of associated documentation and source code. Since both the seed and start values are used in generating the random number values, the way in which these values are derived need only be protected. For example, in a simple case, the only value that need be obscured or safeguarded from disclosure is the seed value which is an arbitrary value selectable upon a last minute notice for generating valid key values.

The novel features which are believed to be characteristic of the invention both as to its organization and method of operation, together with further objects and advantages, will be better understood from the following description when considered in connection with the accompanying drawings. It is expressly understood, however, that each of the drawings is given for the purpose of illustration only and is not intended as a definition of the limits of the present invention.

DETAILED DESCRIPTION OF THE PREFERRED EMBODIMENT

Figure 1A:
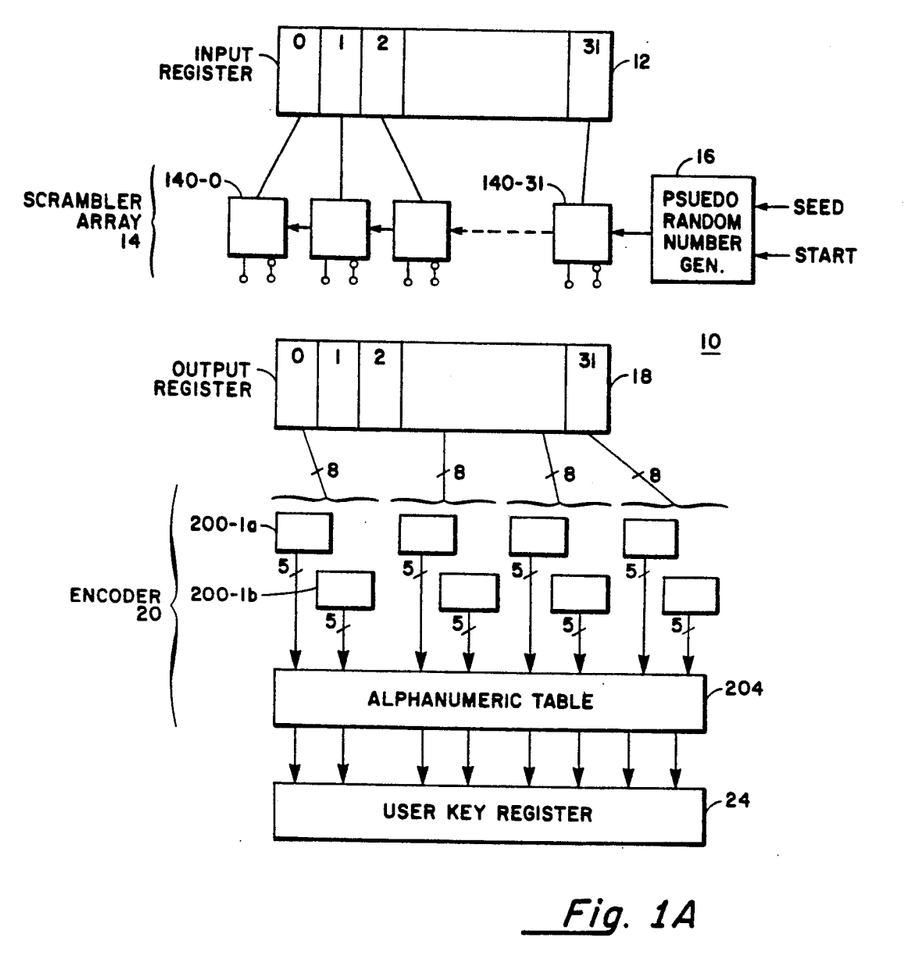
FIG. 1A is a block diagram of the protection mechanism of the present invention.

FIG. 1A illustrates in block diagram form, the protection mechanism 10 of the present invention. The different elements of FIG. 1A are organized to generate a key value from an input binary value as well as perform the reverse operation of generating an input binary value from a user supplied key value. As shown, the mechanism 10 includes an input register 12 for storing a 32 bit binary value. The different bit position outputs are applied as inputs to a scrambler memory switching array 14. The array 14 provides 32 multibit containers 140-0 through 140-31 for storing a sequence of random number values generated by a pseudo random number generator 16, conventional in design.

Each container 140 includes multibit storage for a five bit random number value in addition to exclusive or means for performing an exclusive or of the numeric value of bit position of the input binary bit applied as an input from input register 12 with the random number value stored in the container 140. The least significant bit of the result of the exclusive or operation defines if the input binary bit or its complement is to be applied as the output of container 140.

As shown, containers 140-0 through 140-31 provide inputs to the different bit positions of a 32 bit output register 18. Each container 140 is able to provide an input to any one of the 32 bit positions of register 18 as a function of the random number value it contains. This arrangement is diagrammatically illustrated in FIG. 1B. As shown, the container 140 has a number of sets of outputs, each set consisting of two outputs, a direct non-inverting output 140a and a complement or inverting output 140b denoted by the bubble symbol.

Figure 1B:
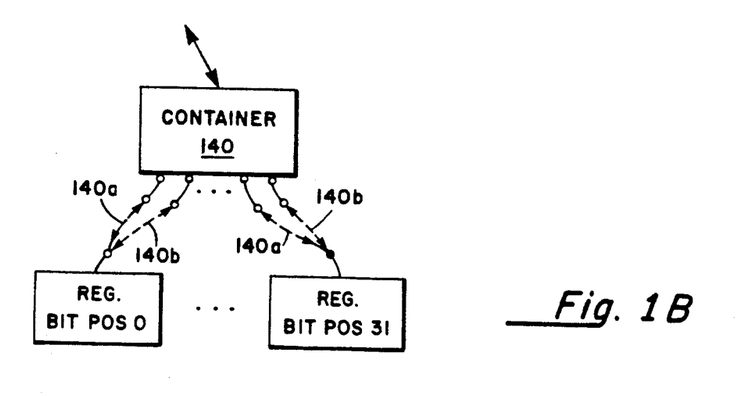
FIG. 1B shows in greater detail, a portion of the protection mechanism of FIG. 2.
Figure 1C:
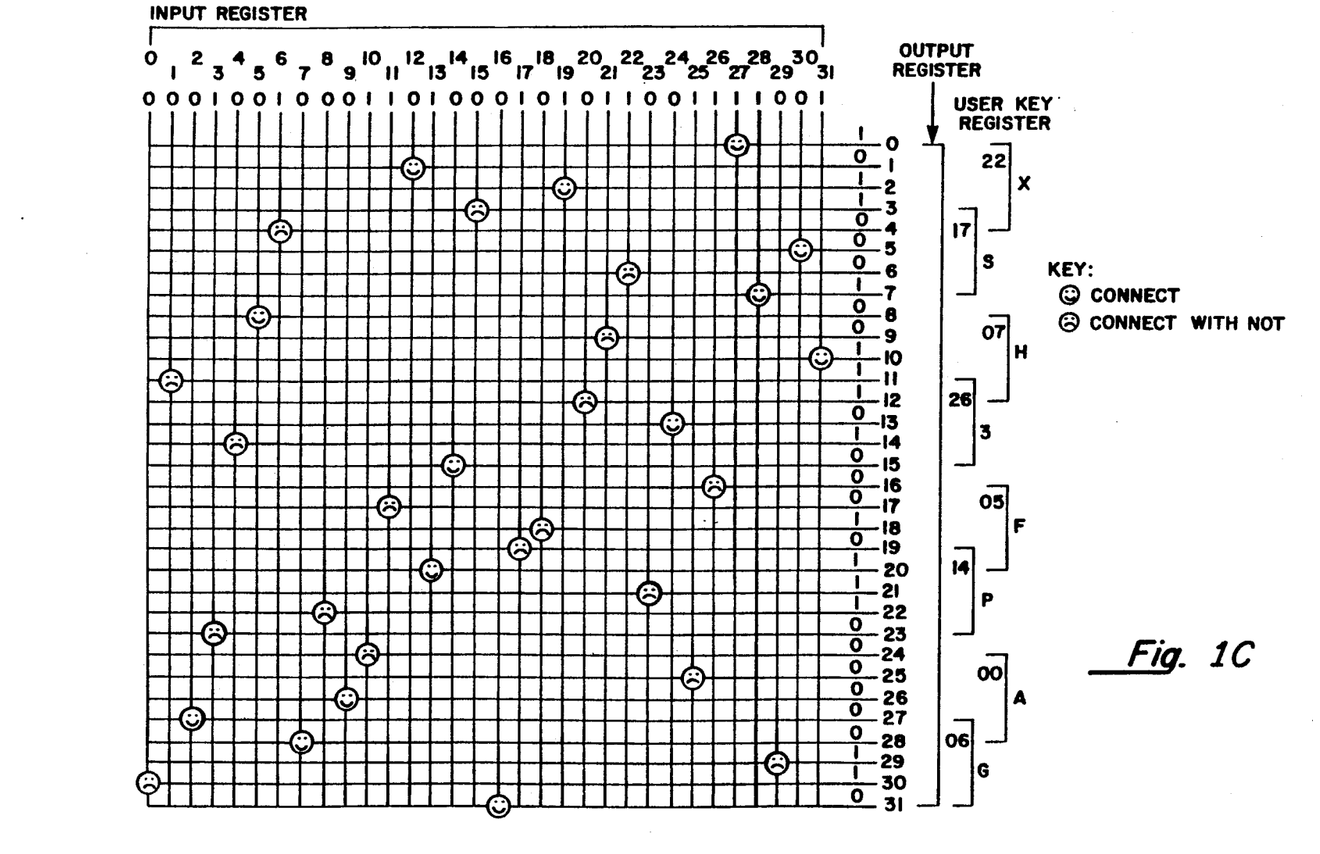
FIG. 1C is a diagram used in illustrating the operation of the protection mechanism of FIG. 1A.

The direct or complement output of each container 140 is logically connectable as an input to any one of the 32 bit positions of the output register 18. The particular bit position is selected as a function of the random number value stored in the container. A portion of FIG. 1C graphically illustrates the connections dynamically provided by scrambler array 14 for a representative unique sequence of random number values. The connections shown in FIG. 1C are defined in the table given below.

TABLE

| Scrambler Array | | | | | | | |
|---|---|---|---|---|---|---|---|
| Input | Output | Input | Output | Input | Output | Input | Output |
| 00 | NOT 30 | 01 | NOT 11 | 02 | 27 | 03 | NOT 23 |
| 04 | NOT 14 | 05 | 08 | 06 | NOT 04 | 07 | 28 |
| 08 | NOT 22 | 09 | 26 | 10 | NOT 24 | 11 | NOT 17 |
| 12 | 01 | 13 | 20 | 14 | 15 | 15 | NOT 03 |
| 16 | 31 | 17 | NOT 19 | 18 | NOT 18 | 19 | 02 |
| 20 | NOT 12 | 21 | NOT 09 | 22 | NOT 06 | 23 | NOT 21 |
| 24 | 13 | 25 | NOT 25 | 26 | NOT 16 | 27 | 00 |
| 28 | 07 | 29 | NOT 29 | 30 | 05 | 31 | 10 |

As shown in FIG. 1A, the binary contents of the output register 18 are applied as inputs to an alphanumeric encoder 20. The encoder 20 includes four sets of overlapping 5-bit registers 200-1a,1b through 200-4a,4b. Each of the sets of registers receive as inputs, a different 8-bit character or byte from output register 18. The 5-bit output of each register is applied as an input to a table 204. The table 204 contains 32 different alphanumeric characters. The contents of each set of registers 200-1a, 1b through 200-4a, 4b are used as indexes into the table 204 for obtaining eight alphanumeric characters which are stored in a user key register 24.

In the preferred embodiment of the present invention, table 204 includes the key characters shown below and discussed relative to in FIG. 1C:

| Alphanumeric Encode/Decode Table | |
|---|---|
| Index | Character |
| 0 | A |
| 1 | B |
| 2 | C |
| 3 | E |
| 4 | D |
| 5 | F |
| 6 | G |
| 7 | H |
| 8 | I |
| 9 | J |
| 10 | K |
| 11 | L |
| 12 | M |
| 13 | N |
| 14 | P |
| 15 | Q |
| 16 | R |
| 17 | S |
| 18 | T |
| 19 | U |
| 20 | V |

| Alphanumeric Encode/Decode Table | |
|---|---|
| Index | Character |
| 21 | W |
| 22 | X |
| 23 | Y |
| 24 | Z |
| 25 | 2 |
| 26 | 3 |
| 27 | 4 |
| 28 | 5 |
| 29 | 6 |
| 30 | 7 |
| 31 | 8 |

The characters "O" and "1" were excluded to avoid problems in distinguishing between ZEROS and the letter "0," ONES and the letter I or L. FIG. 1C illustrates the manner in which an input binary value (0001 . . . 1001) contained in input register 12 is transformed into the string of alphanumeric characters AGFPH3XS. Also, FIG. 1C illustrates the reverse operation of transforming the string of alphanumeric characters AGFPH3XS into the input binary value 0001 . . . 1001. These operations are illustrated for the unique sequence of random number values indicated in scrambler array table. The sequence corresponds to the random number values 30, 11, 27, 23, 14, 08, 04, 28, 22, 26 . . . through 10.

Figure 4A:
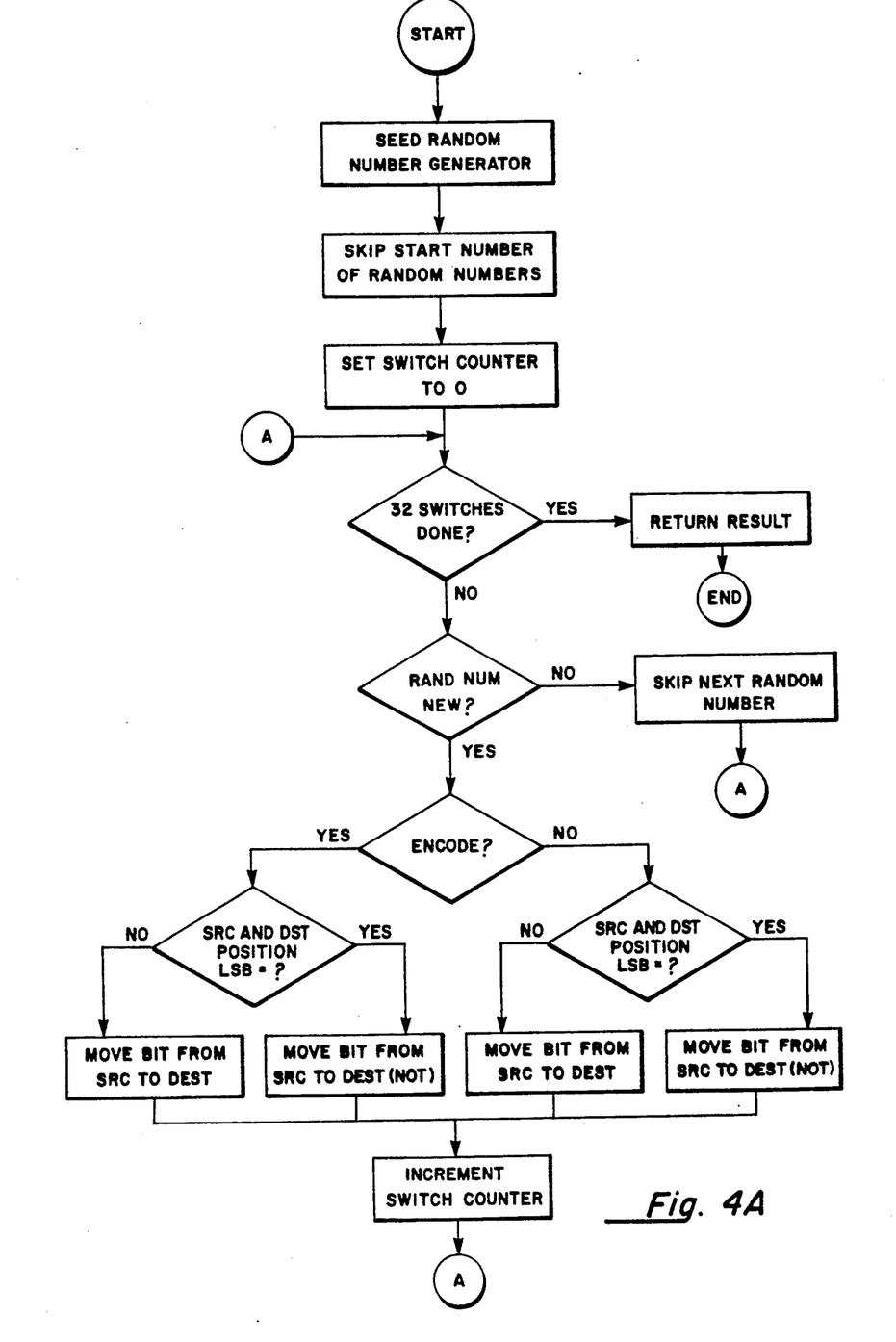
FIGS. 4A through 4C are flow diagrams used in describing the operation of the systems of FIGS. 1A and 1B.

In the preferred embodiment, the scrambler and alphanumeric encoder functions are implemented by the use of different program routines. More specifically, the scrambler array operation is carried out by a mix function of FIG. 4A. The routine takes a 32-bit value and randomly rearranges the bits to form another 32-bit value. This is accomplished by generating a list of the numbers from 0 to 31 in random order and moving each bit position to a new bit position indicated by that list. As shown in FIG. 4A, the value of encode flag parameter is used to control the direction of movement through the scrambler. The mix function makes use of a conventional pseudo random number generator.

As shown in FIG. 4A, the seed value is applied as an input to the pseudo random number generator. As indicated, this type of generator is normally included as part of a standard C runtime library (SRAND routine which receives the seed value and the RAND function which returns a pseudo random number value). Such runtime libraries are normally provided in operating system which utilize the C programming language. Equivalent generators are available for use with other programming languages. Additionally, a start number value is also applied which results in skipping a designated number of random number sequences. Since both the seed and start values are arbitrary values, they can be selected in a way to ensure security.

As seen from FIG. 4A, a switch counter is set to zero, and the number of scrambler switches is checked to determine if all 32 switches have been processed. Next, the mix function checks if the random number to be loaded is new (unique). There must be 32 unique numbers stored in containers 140-0 through 140-31. If it is not unique, the function skips to another random number of the sequence. Next, the mix function checks if the mechanism is performing an encoding function or a decoding function. As shown, in either case, the mix function compare the least significant bit of the numeric value of each source bit position and each destination bit position (i.e., the random number value stored in the associated container) to determine if they are equal. This is carried out by exclusively oring of these bits. When they are not equal, the bit being moved is moved to the non-inverting input bit position. When they are equal, the bit being moved is moved to the inverting or complementing bit position. This is followed by incrementing the switch counter by one. The above sequence is repeated until all 32 switches are done. As shown, the mix function returns the result which corresponds to the 32-bit value stored in output register 18 or the 32-bit input binary value stored in input register 12. The source code for the mix function is shown in Appendix I.

The alphanumeric encoder function is carried out by a make key function routine and a make value function routine. The make key function routine takes a 32-bit value and converts it into a series of alphanumeric characters. This is accomplished by extracting groups of 5 bits and using that as an index into the table of 32 alphanumeric characters. Each byte is used to form two characters, one from the high order five bits and the other from the low order five bits. A null character is placed at the end of the string of eight characters. A pointer is returned to this static string and copy would normally be made of the string before the make key function is called again.

Figure 4B:
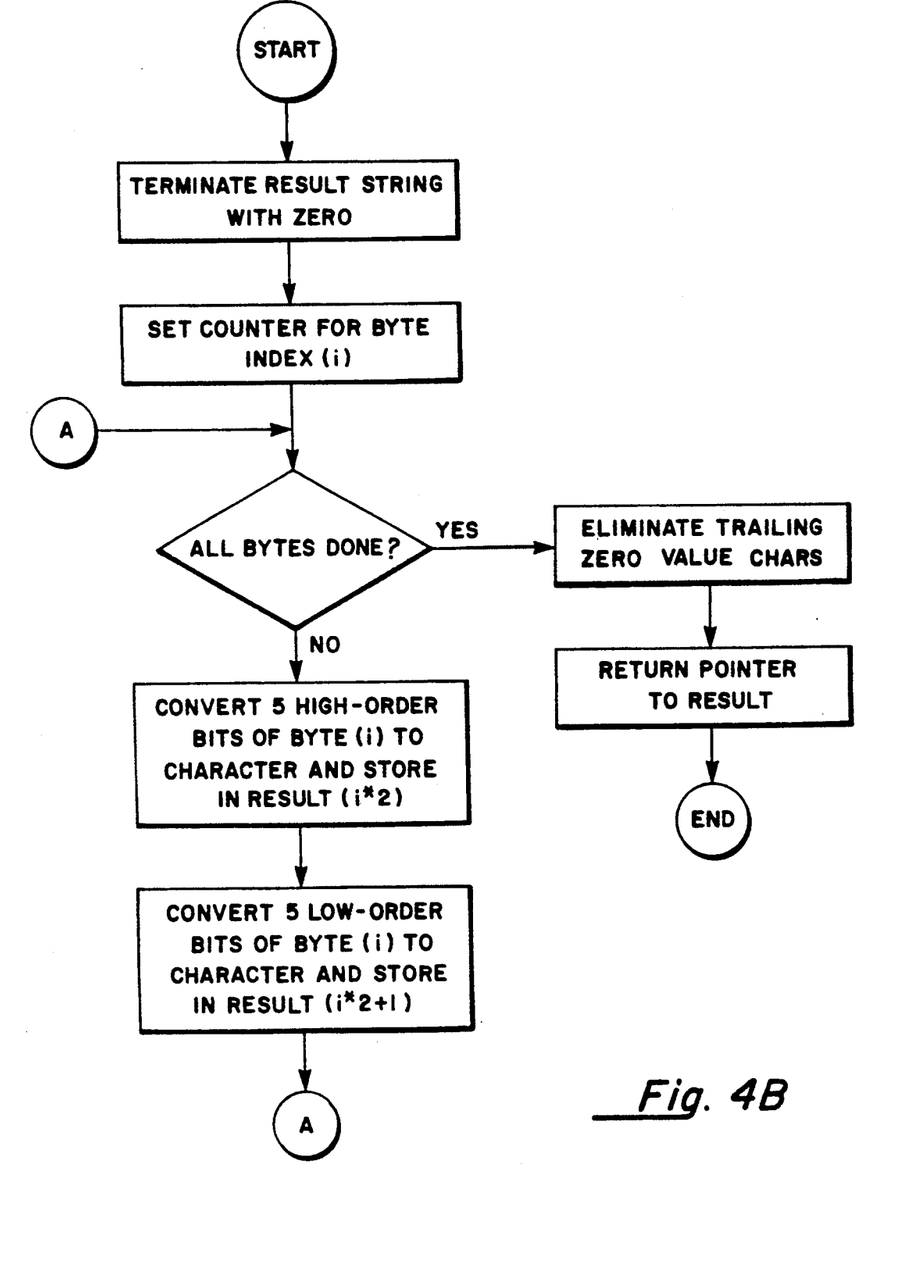

FIG. 4B is a flow diagram illustrating the operation of the make key function. The input binary value is viewed as consisting of four bytes designed as bytes 0 through 3. As shown, this function first terminates the stored result string with a null or zero character. Next, the function establishes a counter for storing a byte numerical index value of (i). This value identifies the index for the byte to be converted. Since this is the first pass, the make key function converts the five high order bits of byte (i) into the character obtained from the alphanumeric table and stores the character in result location at index (i*2). Next, the make key function converts five low order bits of byte (i) into the character obtained from the alphanumeric table and stores the character in result location at index (i*2+1). When all four of the bytes have been processed, the function eliminates all trailing zero value characters and then returns a pointer designating the location of the result. The source code of this function is shown in Appendix II.

Figure 4C:
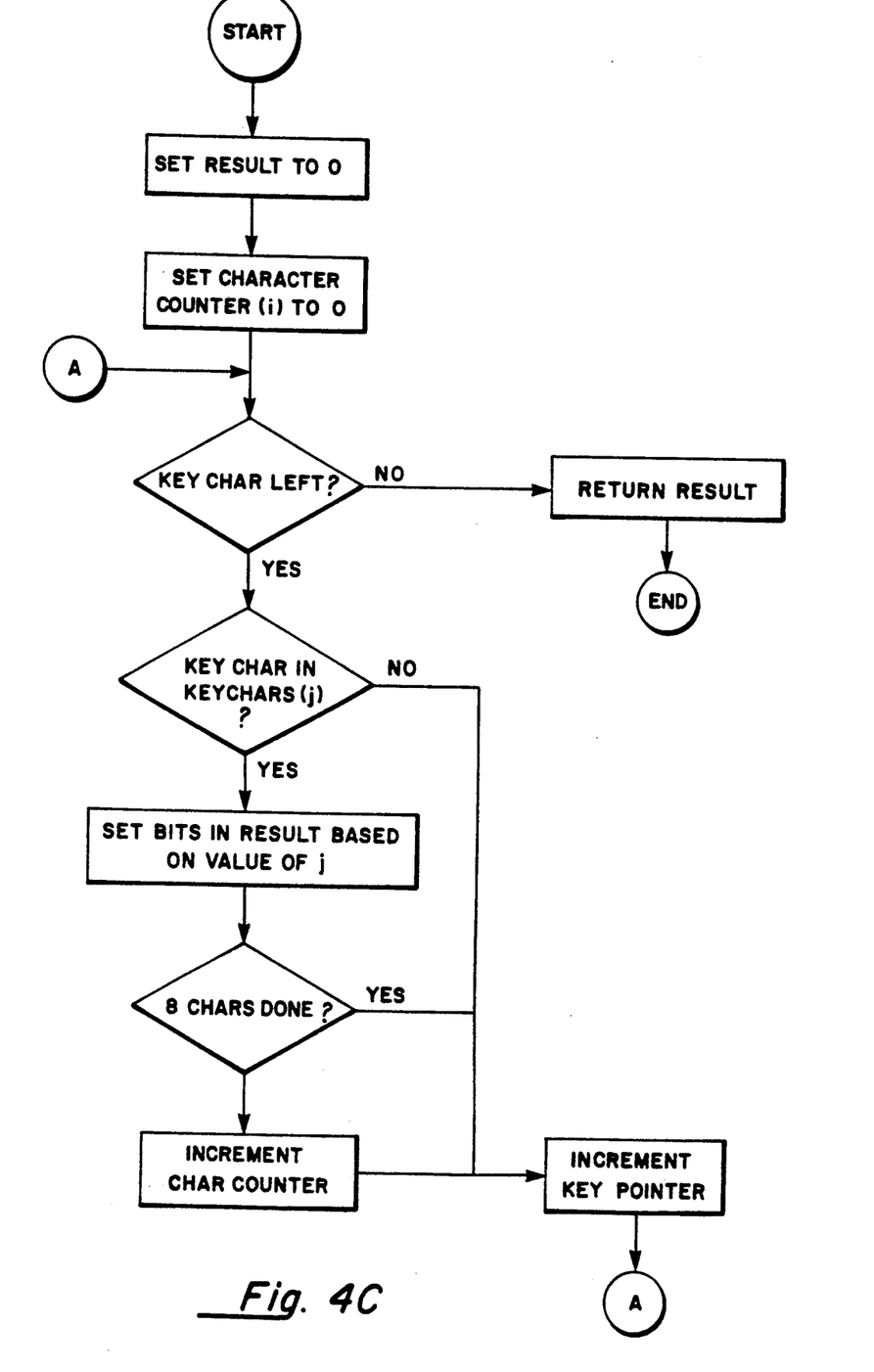

The make value function takes a series of alphanumeric characters and converts them into a 32-bit value. This is accomplished by forming a 5-bit value from the alphanumeric character and combining them to form the 32-bit value. Each character is searched for in the table 204 and its position is used as the value. FIG. 4C is a flow diagram illustrating the operation of the make value function. As shown, the make value function first sets the result field to zero and sets a character counter (i) equal to zero. Next, it determines if there is a key character left. Next, it looks up the key character in the "keychars" table. If the key character is found, then the position or index (j) of the located key character is stored in the result field. If the character count is less than 8, the character counter is incremented by one. Also, the key pointer is incremented by one for processing the next key character. When all of the key characters have been processed, the make value function then returns the result. It will be noted that any extraneous characters included as key characters are ignored since they will not be found in the table. The source code of this routine is shown in Appendix III.

DESCRIPTION OF OPERATION

Figure 2:
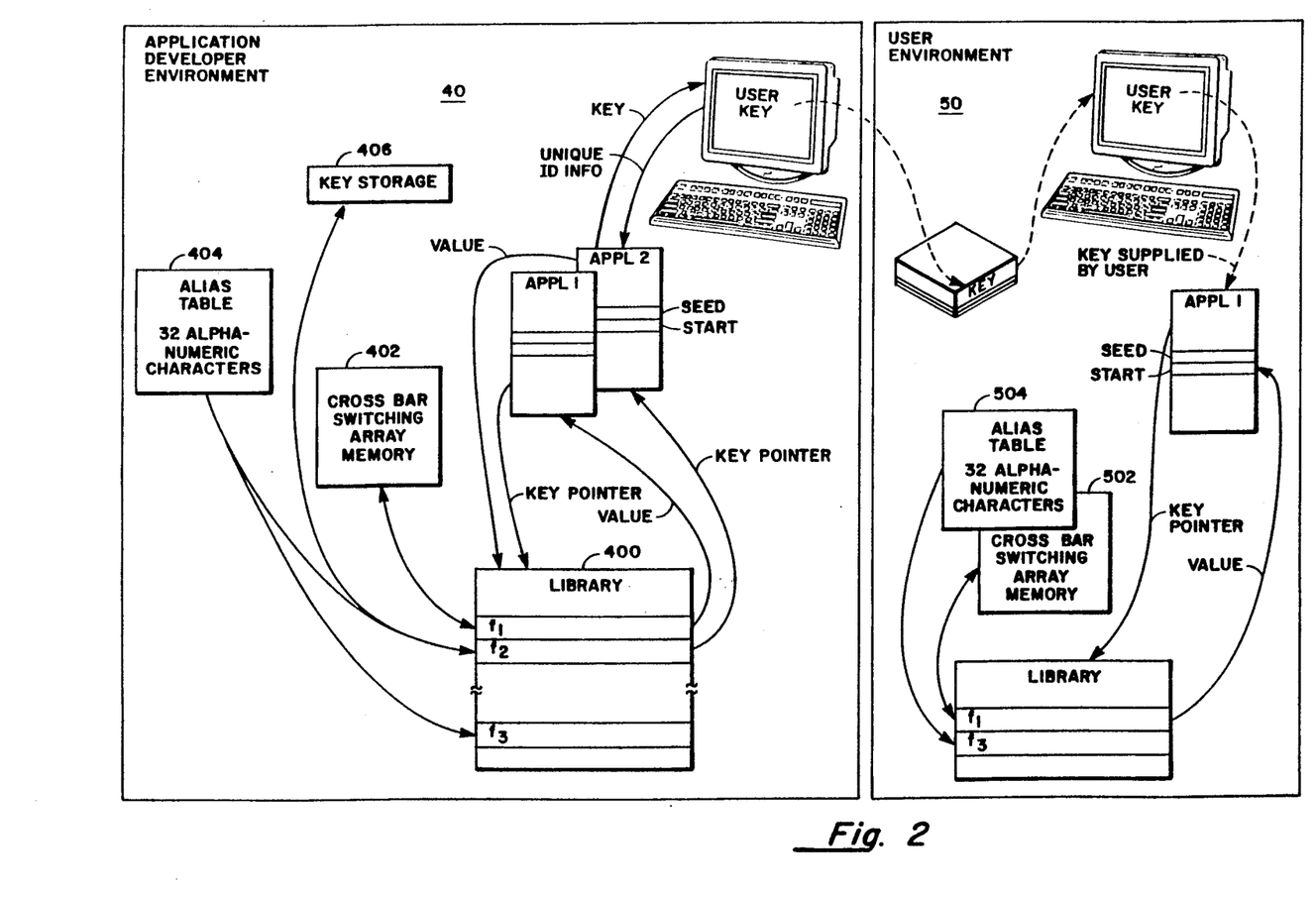
FIG. 2 is a diagram illustrating user and system environments which utilize the protection mechanism of the present invention.
Figure 3A:
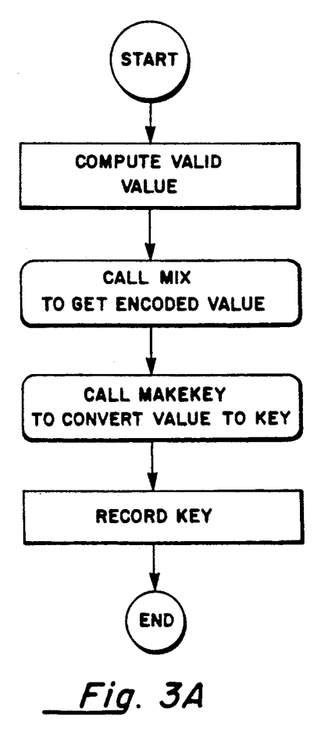
FIGS. 3A and 3B are flow diagrams used in describing the operation of the protection mechanism of FIG. 2.
Figure 3B:
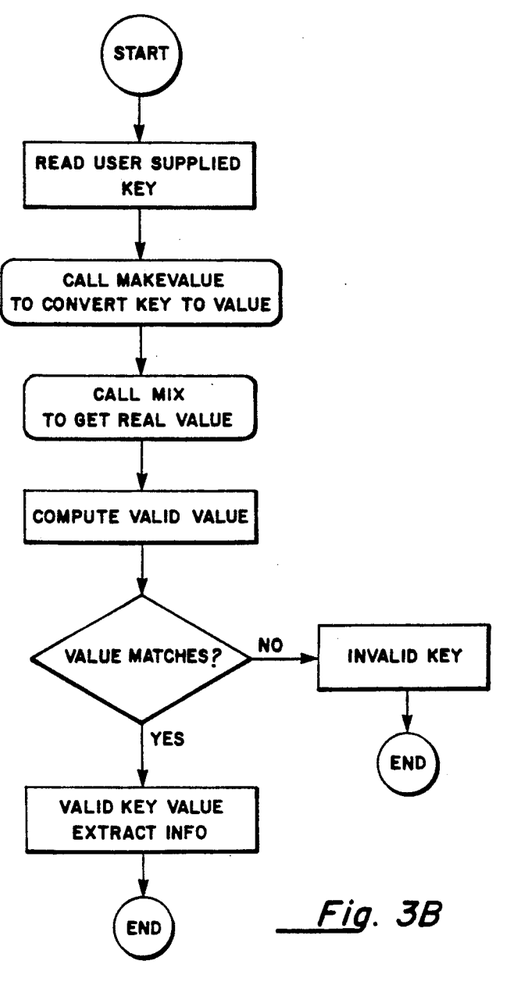

With reference to FIGS. 1A through 1C and 2, the utilization of the protection mechanism 10 will now be described relative to the flow diagrams of FIGS. 3A and 3B. FIG. 2 depicts both developer and user environments which utilize the teachings of the present invention. The protection mechanism 10 when utilized in the application developer system environment 40 includes the encoding routines to compute a valid key. It also may include the decoding routines also utilized in the user environment 50 for verifying that the application is correctly processing the key values using valid and invalid keys.

As indicated in FIG. 2, all of these routines are stored in a library 400 linked to the applications 1 and 2 being run. Also, the system environment 40 includes storage for the scrambler switching array memory 402 equivalent to array 14 of FIG. 2 and an alias table 404 which is equivalent to table 204 of FIG. 2. Application 2 is run by the developer for the purpose of generating a valid key. More specifically, the application provides seed and start values generated as a function of certain identification information provided by the developer. For example, the start value is determined by CPU serial number while the seed is selected for a particular product and its value is hidden to the extent possible. The seed and start values are applied as inputs to the pseudo random number generator program included as part of the developer environment 40. Additionally, the application supplies a 32-bit binary value. In accordance with the invention, the application calls mix function routine stored in library 400 and provides as inputs, the seed, start and the 32-bit binary value. The routine produces as an output, another 32-bit value whose bits have been randomly rearranged utilizing scrambler array 402 in the manner previously described. Next, the make key function routine is called as shown in FIG. 3A. This routine takes the 32-bit value provided by the mix function routine and converts it to a string or series of alphanumeric characters utilizing alias table 404 in the manner previously described. The routine puts a null character at the end of the string and stores it in a key storage memory 406. As indicated in FIG. 2, a key pointer to this static string is returned by the routine to application 2. This completes the encoding sequence.

The developer then verifies that the application is correctly processing key values by running application 1. This sequence is shown in FIG. 3B. The application first reads the user supplied key which in this case corresponds to a previously generated key or a test value. The key is referenced via the key pointer. Next, the application calls the make value function. This function takes the string of alphanumeric characters and converts them into a 32-bit value by searching alias table 404 in the manner previously described. As described in FIG. 3B, next a call is made to the mix function routine of library 400. This routine takes the 32-bit value and rearranges its bits utilizing scrambler array 402 to form another 32-bit value which corresponds to the input binary value.

As shown in FIG. 2, this number is returned to the application. The values are compared by the application of FIG. 3B and if the appropriate parts match identically, the key is deemed valid. From the valid value derived from the user supplied key, certain information can be extracted as explained herein. Such computed valid key value can include the serial number of the system machine, a product code and an encoded value representing the maximum number of users allowed in the system. More specifically, the 32-bit valid key value may contain the following information:

| 01 ... 19 | 20 ... 27 | 28 ... 31 |
|---|---|---|
| CPU Serial No. | PRODUCT CODE | MAX USERS. |

Also, the 32-bit valid key value could contain duplicate data as follows:

| 0 ... 6 | 8 ... 15 | 16 ... 22 | 23 ... 31 |
|---|---|---|---|
| YEAR-1990 | DAY OF YEAR | YEAR-1990 | DAY OF YEAR. |

In the case where the valid key value contains the CPU serial number and product code, the application, by accessing such information, can compare these values and, if they match, the application can extract the maximum user field and use that value. In the case where the valid key value contains duplicate data, the key value is validated by comparing the duplicated data.

As indicated, FIG. 2 also shows user system environment 50. This environment only contains the routines for verifying the key. As shown, the developer normally provides the valid key along with the user environment application packaged in a shrink-wrapped container as is standard in the software industry. The user enters the user key which is furnished to the application. The application performs the sequence of operations of FIG. 3B. As previously explained, this involves calling the make value function routine which converts the key to a 32-bit value. This is followed by calling the mix function which rearranges the 32 bits to form the real 32-bit binary value. The information used for validation is extracted from the key value and compared with known values by the application for establishing that the key is valid. If it is, the application can extract additional information such as maximum number of users. Appendices IV and V provide the source code for the functions of FIGS. 3A and 3B.

From the above, it is seen how the protection mechanism of the present invention is able to provide key values associated with software packages that cannot be easily duplicated and which contain information useful in license verification. The protection mechanism details as well as source code need not be protected. Therefore, only a minimal amount of information needs to be hidden or concealed thereby reducing the extent of security measures normally required.

Further, since the protection mechanism does not depend upon the formatting or ordering of bits, bytes, etc., it can be used to generate valid keys on any type of machine. It is only required that such machine provide a pseudo random number generator. Another advantage of the protection mechanism is that it requires a minimal amount of code to implement the required functions.

It will be obvious to those skilled in the art that many changes may be made to the protection mechanism of the present invention. For example, different user identification information may be used in conjunction with the mechanism. Also, only portions of the protection mechanism may be used. For example, the mix function may be used separately to encrypt an input binary value. Similarly, the alphanumeric encoder/decoder or make key/make value function may be used separately to encode/decode an input binary value into an alphanumeric string of characters.

Appendix I

```
static int        newbit[32];

unsigned long
mix(encode, seed, start, invalue)
int               encode, seed, start;
unsigned long     invalue;
{
    int              nbi, randi;
    unsigned long    outvalue = 0;

srand(seed);
    for (randi = 0; randi < start; randi++)
     rand();
    nbi = 0;
    while (nbi < 32)
    {
     newbit[nbi] = (rand() >> 3) & 0x1f;
     for (randi = 0; randi < nbi; randi++)
     {
        if (newbit[nbi] == newbit[randi])
        {
         newbit[nbi] = (rand() >> 3) & 0x1f;
         break;
        }
     }
     if (randi == nbi)
     {
        if (encode)
        {
         if ((newbit[nbi] ^ nbi) & 0x1)
            outvalue |= (unsigned long)((invalue >>
                        newbit[nbi]) & 0x1) << nbi;
         else
            outvalue |= (unsigned long)!((invalue >>
                        newbit[nbi]) & 0x1) << nbi;
        }
        else
        {
         if ((newbit[nbi] ^ nbi) & 0x1)
            outvalue |= (unsigned long)((invalue >> nbi)
                        & 0x1) << newbit[nbi];
         else
            outvalue |= (unsigned long)!((invalue >> nbi)
                        & 0x1) << newbit[nbi];
        }
        nbi++;
     }
    }
    return (outvalue);
}
```

Appendix II

```
static char       keychars[] =
"ABCEDFGHIJKLMNPQRSTUVWXYZ2345678";
static char       keyout[9];

char              *
makekey(invalue)
unsigned long     invalue;
{
    int              i;

keyout[8] = 0;
    for (i = 0; i < 4; i++)
    {
```

```
            keyout[i * 2] = keychars[(invalue >> ((i * 8) + 3)) &
                                    0x1f];
            keyout[i * 2 + 1] = keychars[(invalue >> (i * 8)) &
                                    0x1f];
        }
        for (i = 7; keyout[i] == keychars[0] && i > 0;
                keyout[i--] = 0);
        return (keyout);
}
```

Appendix III

```
static char         keychars[] =
"ABCEDFGHIJKLMNPQRSTUVWXYZ2345678";

unsigned long
makevalue(key)
char                *key;
{
    unsigned long   outvalue = 0, j;
    int             i;

i = 0;
    while (*key)
    {
      for.(j = 0; j < 32; j++)
       {
          if (*key == keychars[j])
          {
            switch (i % 2)
            {
            case 0:
                outvalue |= j << (3 + (i / 2) * 8);
                break;
            case 1:
                outvalue |= j << ((i / 2) * 8);
                break;
            }
            if (i < 8)
                i++;
            break;
          }
      }
      key++;
    }
    return (outvalue);
}
```

Appendix IV

```
/*
    To build a key generator, compile with cc -O -o keygen keygen.c and run keygen serial_no product_letter [special_key]
*/ unsigned long machine_sn(void);  /* returns machine serial
number */ main(argn, argv)
int                 argn;
char                *argv[];
{
    unsigned long   serial, value;
    unsigned long   special = 0;
    char            product;
```

```c
    if (argn < 3 || argn > 4)
    {
     fprintf(stderr,
        "Usage: %s serial_no product_letter [special_key]\n",
        argv[0]);
     exit(1);

}
    if (argn == 4)
    {
     special = atoi(argv[3]);
     if (special & 0xfffffff0)
     {
      fprintf(stderr,
          "Warning: special_key truncated to 4 bits(%d)\n",
          special & 0x0f);
     }
    }
    product = argv[2][0];
    serial = atoi(argv[1]);
    value = (serial << 12) | (product << 4) | (special &
                                                    0xf);
    printf("%s\n", makekey(mix(1, 4, serial, value)));
    return(0);
}
```

Appendix V

```c
/*
    To a key decoder, compile with cc  -O -o keydecode keydecode.c and run keydecode key
*/ unsigned long machine_sn(void); /* returns machine serial
number */ main(argn, argv)
int             argn;
char            *argv[];
{
    unsigned long   serial, goodvalue, value;
    char            product = 'z';

if (argn != 2)
    {
     fprintf(stderr, "Usage: %s key\n", argv[0]);
     exit(1);
    }
    serial = machine_sn();
    goodvalue = (serial << 12) | (product << 4);
    value = mix(0, 1, serial, makevalue(argv[1]));
    printf("Value = %8.8lx\n", value);
    if ((value & 0xfffffff0) == goodvalue)
    {
     printf("Key is good: data is %d\n",
            (int)(value & 0xf));
     return(0);
    }
    else
    {
     printf("Key is bad!\n");
     return(-1);
    }
}
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A protection mechanism for generating user key values from input binary values and for transforming key values into binary values in a manner that does not require security precautions for preventing disclosure of the manner of generating said user key values, said mechanism comprising:

an input register having n number of bit positions for storing a first binary value having n number of bits which is being converted into a key value;

a pseudo random number generator connected to receive seed and start values, said generator in response to said seed and start values generating repeatable sequences of random number values;

a scrambler including an array including n number of multibit containers for storing n number of unique multibit random number values included in said repeatable sequences;

said scrambler including means for randomly rearranging said n number of bits of said binary value as a function of said multibit random number values stored in said n number of containers to form a second n bit binary value; and, an alphanumeric encoder operatively coupled to said scrambler for receiving said second n bit binary value, said encoder including a table for storing a plurality of alphanumeric characters, said encoder using portions of said second binary value for referencing different ones of said alphanumeric characters to produce a series of alphanumeric characters representing one of said user key values.

2. The mechanism of claim 1 wherein said scrambler further includes an output register for storing said second n bit binary value, said scrambler randomly rearranging said n number of bits by moving each of said n number of bits to a new bit position of said output register as a function of one of said n number of unique multidigit random number values stored in a corresponding one of said multibit containers.

3. The mechanism of claim 2 wherein said each of said n sets of containers includes complementing and non-complementing outputs which operatively connect to said output register and wherein scrambler further includes n number of exclusive OR means, each of said exclusive OR means exclusively ORing numeric bit position and random number values of corresponding ones of said input register and container to produce a least significant bit value whose state selects one of said complement and non-complement outputs for applying a corresponding one of said n number of bits of said input binary value to said output register.

4. The mechanism of claim 1 wherein said first and second binary values include a predetermined number of bytes and wherein said portions of said second binary value correspond to groups of m number of bits extracted from said second binary value wherein m has a value less than said predetermined number of bytes, said groups of bits being used as indexes into said table for producing said series of alphanumeric characters.

5. The mechanism of claim 1 wherein said start and seed values are arbitrary values which require safeguarding to prevent duplication of valid keys notwithstanding disclosure of said protection mechanism.

6. A method for generating key values in a manner which does not require security precautions for preventing disclosure of the way in which such key values are generated, said method comprising the steps of:

(a) storing in a first register a first binary value having n number of bits which are to be converted into a key value;

(b) generating a sequence of random number values by applying seed and start values to a pseudo random number generator;

(c) storing n number of unique random number values in a corresponding number of multibit container locations of an array;

(d) scrambling said bits of said first binary number by rearranging said n number of bits as a function of said n number of random number values stored in said container locations to produce a second binary value; and, (e) encoding said second binary value into a series of alphanumeric characters which contain n number of bits usable as on of said key values.

7. The method of claim 6 wherein said n number of bits of said first binary value is assigned a corresponding number of numeric bit position values defined by bit positions of said first register and wherein step (d) further includes the steps of:

(f) exclusively ORing each of said n number of numeric bit position values of said first binary value and a corresponding one of said n number of multibit random number values to produce n number of least significant bit values; and, (g) using each least significant bit state for determining if a corresponding one of said n number of bits of said first binary value is to be complemented before being encoded.

8. The method of claim 7 wherein step (g) further includes the step of complementing said corresponding one of said n number of bits of said first binary value prior to encoding when said each least significant bit is in a first state and not complementing said corresponding one of said n number of said first binary value when said each least significant bit is in a second state.

9. The method of claim 8 wherein said first and second states correspond to binary ONE and ZERO states, respectively.

10. The method of claim 6 wherein said first and second binary values, each include a predetermined number of bytes and wherein step (e) of said method includes the step of:

(i) using different portions of each byte of said second binary value as indexes into a table for referencing different alphanumeric characters to produce said series of alphanumeric characters.

11. The method of claim 10 wherein said different portions correspond to groups of m number of bits extracted from each byte of said second binary value wherein m has a value less than said predetermined number of bytes.

12. A protection mechanism for generating user key values from input binary values and for transforming key values into binary values in a manner that does not require security precautions for preventing disclosure of the manner of generating said user key values, said mechanism comprising:

an input register having n number of bit positions for storing a first binary value having n number of bits which is being converted into a user key value;

a pseudo random number generator connected to receive seed and start values, said generator in response to said seed and start values generating repeatable sequences of random number values;

a scrambler including an array including n number of multibit containers for storing n number of unique multibit random number values included in said repeatable sequences; and, said scrambler including means for randomly rearranging said n number of bits of said binary value as a function of said multibit random number values stored in said n number of containers to form a second n bit binary value representative of one of said user key values.

13. A protection mechanism for generating user key values from input binary values and for transforming key values into said input binary values, said mechanism comprising:

an input register having n number of bit positions for storing a first binary value having n number of bits which is either being converted into a user key value or has been transformed into an input binary value; and, an alphanumeric encoder/decoder operatively coupled to said input register for receiving said first n bit binary value, said encoder/decoder including a table for storing a plurality of alphanumeric characters, said encoder/decoder using portions of said second binary value for referencing different ones of said alphanumeric characters to produce a series of alphanumeric characters representing one of said user key values and said encoder/decoder using each of said series of alphanumeric characters as index into said table for transforming said series of alphanumeric characters into one of said input binary values.

* * * * *